(12) United States Patent
Hasegawa

(10) Patent No.: US 12,142,144 B2
(45) Date of Patent: Nov. 12, 2024

(54) INFORMATION PROCESSING DEVICE, VEHICLE, INFORMATION PROCESSING METHOD, AND NON-TRASITORY STORAGE MEDIUM FOR PROVIDING GUIDANCE INFORMATION INSTRUCTING AN OCCUPANT HOW TO HANDLE A VEHICLE FROM A RECEIVED EMERGENCY MESSAGE

(71) Applicant: TOYOTA JIDOSHA KABUSHIKI KAISHA, Toyota (JP)

(72) Inventor: Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 223 days.

(21) Appl. No.: 17/671,010

(22) Filed: Feb. 14, 2022

(65) Prior Publication Data

US 2022/0270481 A1 Aug. 25, 2022

(30) Foreign Application Priority Data

Feb. 24, 2021 (JP) ................................. 2021-027814

(51) Int. Cl.
*G08G 1/0967* (2006.01)
*G06T 11/00* (2006.01)
*G09G 3/20* (2006.01)

(52) U.S. Cl.
CPC ............ *G08G 1/0967* (2013.01); *G06T 11/00* (2013.01); *G09G 3/2092* (2013.01); *G09G 2380/10* (2013.01)

(58) Field of Classification Search
CPC .......... G08G 1/0967; G08G 1/096716; G08G 1/09675; G08G 1/096775; G06T 11/00;
(Continued)

(56) References Cited

U.S. PATENT DOCUMENTS

| 2015/0363033 A1* | 12/2015 | Okabe | .................... G06F 3/0412 345/173 |
| 2016/0192033 A1* | 6/2016 | Kitahara | ............... H04N 21/435 725/33 |

(Continued)

FOREIGN PATENT DOCUMENTS

| CN | 108959647 A | 12/2018 |
| CN | 111619582 A | 9/2020 |

(Continued)

OTHER PUBLICATIONS

Tuttle, David P., et al. "Plug-In Vehicle to Home (V2H) duration and power output capability." 2013 IEEE Transportation Electrification Conference and Expo (ITEC). IEEE, 2013. (Year: 2013).*

(Continued)

*Primary Examiner* — Daniel F Hajnik
(74) *Attorney, Agent, or Firm* — Oliff PLC

(57) ABSTRACT

An information processing device that provides information to an occupant of a vehicle is provided. The information processing device includes a control unit that executes: receiving an emergency message notifying occurrence of a predetermined event; and switching a mode from a first display mode to a second display mode that is a mode for providing guide information for instructing the occupant on how to handle the vehicle when the emergency message is received.

5 Claims, 11 Drawing Sheets

(58) Field of Classification Search
CPC ............ G09G 3/2092; G09G 2380/10; G09G 2330/021; G09G 2380/06; G06F 3/147; G08B 21/10; G08B 25/10; H04W 4/024; H04W 4/48; H04W 4/90
See application file for complete search history.

(56) References Cited

U.S. PATENT DOCUMENTS

| | | | |
|---|---|---|---|
| 2019/0308509 A1* | 10/2019 | Herman | .............. B60L 53/35 |
| 2020/0053518 A1 | 2/2020 | Kang et al. | |
| 2020/0273335 A1 | 8/2020 | Murakami et al. | |
| 2020/0384883 A1* | 12/2020 | Amari | ................. B60L 58/12 |

FOREIGN PATENT DOCUMENTS

| | | |
|---|---|---|
| JP | 2007-60489 A | 3/2007 |
| JP | 2009-130836 A | 6/2009 |
| JP | 2013-238961 A | 11/2013 |
| JP | 2015-148582 A | 8/2015 |
| JP | 2020-112969 A | 7/2020 |

OTHER PUBLICATIONS

Xia Guohui, "New Edition of the Electrician's Handbook, Volume III", Yanbian People's Publishing House, p. 2305, Jul. 2001.
Partial Translation of Jul. 24, 2024 Office Action issued in Chinese Patent Application No. 202210131341.7.

\* cited by examiner

FIG. 4

MANUAL DATA

HEADER DATA

| SECTION NUMBER | SUBSECTION NUMBER | PAGE NUMBER |
|---|---|---|
| 1: FOR SAFETY | ... | 24 |
| 2: DISPLAY INFORMATION ON TRAVELING | ... | 86 |
| 3: BEFORE DRIVING | ... | 116 |
| 4: DRIVING | ... | 174 |
| 5: INTERIOR PARTS AND FUNCTIONS | 5-1: AIR CONDITIONER | 284 |
| | 5-2: ROOM LAMPS | 291 |
| | 5-3: STORAGE | 294 |
| | 5-4: POWER SUPPLY SYSTEM FOR EMERGENCY USE | 302 |
| 6: MAINTENANCE | ... | 322 |
| 7: IN CASE OF EMERGENCY | 7-1: MEASURES FOR WATER DAMAGE TO VEHICLE | 358 |
| | 7-2: EVACUATION BY VEHICLE | 410 |
| ... | ... | ... |
| 8: VEHICLE INFORMATION | | 426 |

ELECTRONIC DOCUMENT DATA (BINARY)

FIG. 6

| TYPE OF EMERGENCY MESSAGE | INFORMATION TO BE PRESENTED | PAGE NUMBER IN MANUAL |
|---|---|---|
| EARTHQUAKE EARLY WARNING | HOW TO USE EXTERNAL POWER SUPPLY FUNCTION | P.302 |
| NOTIFICATION OF POWER OUTAGE | HOW TO USE EXTERNAL POWER SUPPLY FUNCTION | P.302 |
| REQUEST TO SAVE POWER | HOW TO USE EXTERNAL POWER SUPPLY FUNCTION | P.302 |
| PREDICTION OF HEAVY RAIN | MEASURES FOR WATER DAMAGE TO VEHICLE | P.358 |
| EVACUATION ADVISORY DUE TO HEAVY RAIN | CAUTIONS FOR EVACUATION BY VEHICLE | P.410 |
| NOTIFICATION OF APPROACH OF HURRICANE | RECOMMENDATION OF CHARGING IN ADVANCE | ... |
| ... | ... | ... |

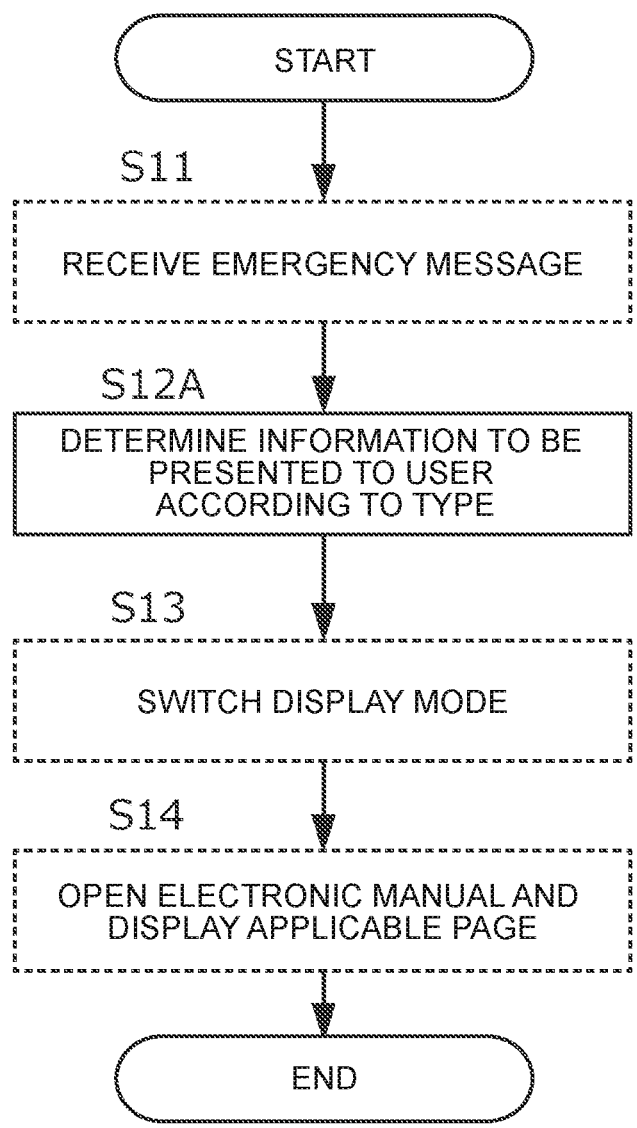

FIG. 8

| TYPE OF EMERGENCY MESSAGE | INFORMATION TO BE PRESENTED | PAGE NUMBER IN MANUAL |
|---|---|---|
| EARTHQUAKE EARLY WARNING | HOW TO USE EXTERNAL POWER SUPPLY FUNCTION | P.302 |
| | CAUTIONS FOR EVACUATION BY VEHICLE | P.410 |
| | INFORMATION ON AVAILABLE GAS STATIONS WHEN POWER OUTAGE OCCURS | ... |
| | ... | ... |
| PREDICTION OF HEAVY RAIN | MEASURES FOR WATER DAMAGE TO VEHICLE | P.358 |
| ... | ... | |

INFORMATION PROCESSING DEVICE, VEHICLE, INFORMATION PROCESSING METHOD, AND NON-TRASITORY STORAGE MEDIUM FOR PROVIDING GUIDANCE INFORMATION INSTRUCTING AN OCCUPANT HOW TO HANDLE A VEHICLE FROM A RECEIVED EMERGENCY MESSAGE

CROSS-REFERENCE TO RELATED APPLICATION

This application claims priority to Japanese Patent Application No. 2021-027814 filed on Feb. 24, 2021, incorporated herein by reference in its entirety.

BACKGROUND

1. Technical Field

The present disclosure relates to an automobile.

2. Description of Related Art

A technique for providing appropriate information in the event of an emergency is known. For example, Japanese Unexamined Patent Application Publication No. 2009-130836 (JP 2009-130836 A) discloses an in-vehicle device that provides a menu frequently used in an emergency situation when the Earthquake Early Warning (EEW) is received.

SUMMARY

The purpose of the present disclosure is to provide appropriate information to an occupant of a vehicle.

A first aspect of the present disclosure is an information processing device that provides information to an occupant of a vehicle. Specifically, the information processing device includes a control unit that executes: receiving an emergency message notifying occurrence of a predetermined event; and switching a mode from a first display mode to a second display mode that is a mode for providing guide information for instructing the occupant on how to handle the vehicle when the emergency message is received.

A second aspect of the present disclosure is a vehicle including a communication module and an information processing device that provides information to an occupant. Specifically, the communication module receives an emergency message notifying occurrence of a predetermined event, and the information processing device switches a mode from a first display mode to a second display mode that is a mode for providing guide information for instructing the occupant on how to handle the vehicle when the emergency message is received.

A third aspect of the present disclosure is an information processing method executed by an information processing device that provides information to an occupant of a vehicle. Specifically, the information processing method includes the steps of: receiving an emergency message notifying occurrence of a predetermined event; and switching a mode from a first display mode to a second display mode that is a mode for providing guide information for instructing the occupant on how to handle the vehicle when the emergency message is received.

Further, another aspect provides a program for causing a computer to execute the above information processing method, or a computer-readable storage medium in which the program is non-transitorily stored.

According to the present disclosure, it is possible to provide appropriate information to the occupant of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a diagram illustrating a structure of manual data;

FIG. 6 is an example of type data that associates a type of emergency message with information to be presented;

FIG. 7 is a flowchart of a process executed by an in-vehicle terminal in a second embodiment;

FIG. 8 is a modified example of type data; and

DETAILED DESCRIPTION OF EMBODIMENTS

Figure 1:
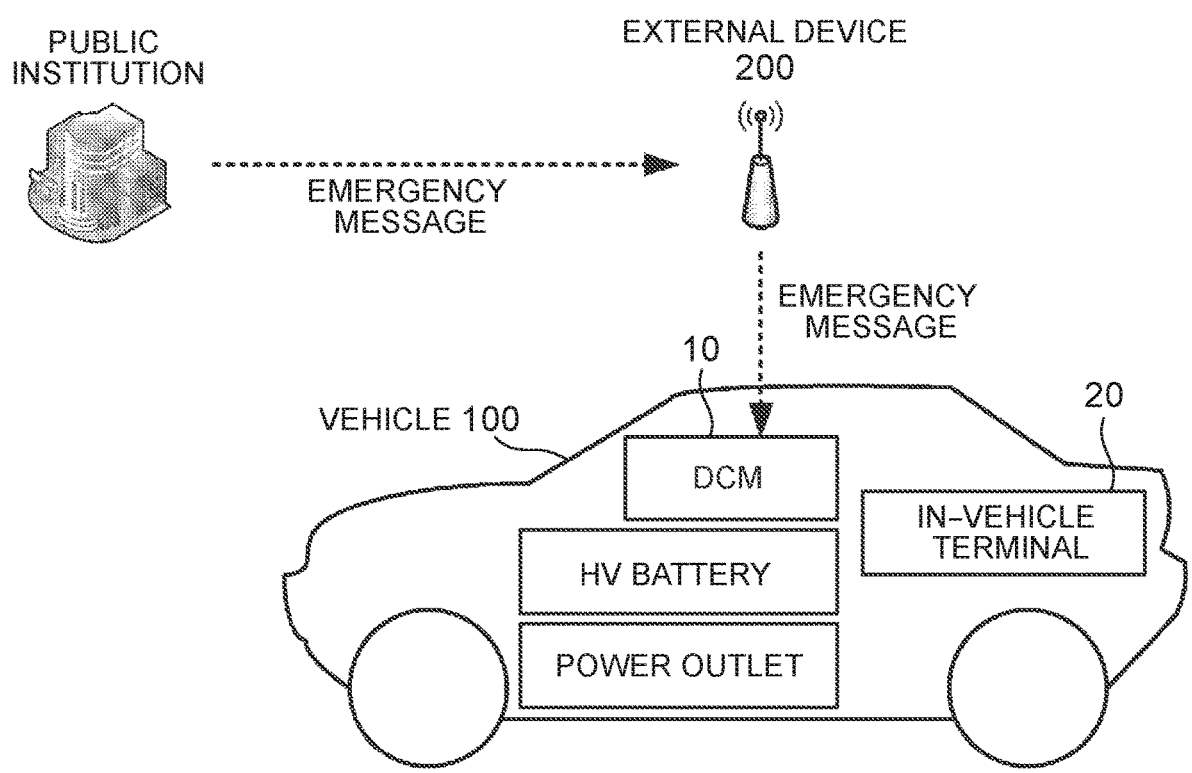
FIG. 1 is a system configuration diagram of a vehicle system according to an embodiment.

One aspect of the present disclosure is an information processing device that provides information to an occupant of a vehicle. Specifically, the information processing device includes a control unit that executes: receiving an emergency message notifying occurrence of a predetermined event; and switching a mode from a first display mode to a second display mode that is a mode for providing guide information for instructing the occupant on how to handle the vehicle when the emergency message is received.

The emergency message is typically a message sent all at once from a public institution or the like to notify the occurrence of a predetermined event. The predetermined event may be related to a natural disaster such as an earthquake, a tsunami, a heavy rain, or a hurricane, or may be related to a living infrastructure such as a power outage. The emergency messages include the Earthquake Early Warning (EEW), tsunami warnings, and weather warnings. When the emergency message is sent, it means that an emergency situation is caused, and some measures may need to be taken for a vehicle in response to the emergency situation. For example, when a power outage occurs due to an earthquake, it is conceivable to supply electric power stored in the vehicle to the outside (for example, a vehicle to home (V2H) system or the like). However, when a user tries to use a function that is not used on a daily basis, there may be a problem that the user does not know how to use the function.

In order to know how to use such a function, the user needs to refer to a manual of the vehicle. However, when the manual is converted into electronic formats, the user has to start downloading the electronic manual and cannot obtain necessary information immediately. Even when the user already has the electronic manual, it is not easy to find the necessary information from the long manual.

In order to solve this problem, the information processing device according to the one aspect of the present disclosure switches a mode from the first display mode to the second display mode that is a mode for providing guide information for instructing the occupant on how to handle the vehicle when the emergency message is received from the outside. The information processing device is typically a navigation device that provides information to the occupant. In this case, the first display mode is a mode for displaying a road map, a current position, traffic information, and the like. The second display mode is a mode for providing information (guide information) for instructing the occupant on how to handle the vehicle. For example, by outputting the electronic manual of the vehicle to the screen, it becomes possible to proactively provide the user to necessary information in an emergency situation.

Further, the second display mode may be characterized by being a mode in which the guide information is provided by omitting at least part of the information provided in the first display mode and using a space obtained as a result of omitting the part of the information. For example, some or all of the displayed road map information may be omitted and the guide information may be output.

Further, the control unit may be characterized by providing the guide information according to a type of the emergency message. For example, a plurality of types of events such as "earthquake", "tsunami", "heavy rain", and "power outage" may be defined in advance to provide appropriate information from among information included in the guide information.

Further, the control unit may be characterized by providing information related to evacuation by the vehicle as the guide information when a type of the emergency message is related to an earthquake. Further, the control unit may be characterized by providing information related to electric power supply from the vehicle as the guide information when a type of the emergency message is related to a power outage. In the event of an earthquake or a power outage, electric power may need to be supplied from the vehicle. Therefore, when the user receives an emergency message related to an earthquake or a power outage, a method of supplying electric power from the vehicle may also be notified to the user.

Further, the information processing device may be characterized by further including a storage unit for storing the guide information to be provided in the second display mode. Further, the storage unit may be characterized in that the type of the emergency message and the type of the guide information to be provided are stored in association with each other. With such a configuration, it is possible to provide the user with appropriate information for each type of the emergency message.

In addition, the control unit may be characterized in that, when a predetermined operation is performed, the control unit switches a mode from the second display mode to the first display mode. For example, the mode can be returned to the first mode by the user's operation when the situation is no longer an emergency.

Hereinafter, embodiments of the present disclosure will be described with reference to the drawings. The configurations of the following embodiments are illustrative, and the present disclosure is not limited to the configurations of the embodiments.

First Embodiment

An outline of a vehicle system according to a first embodiment will be described with reference to FIG. 1. The vehicle system according to the present embodiment includes a vehicle 100 and an external device 200 for sending an emergency message to the vehicle 100.

The vehicle 100 is a hybrid vehicle having a function of supplying power to the outside of the vehicle. The vehicle 100 includes a hybrid battery and a power outlet that is an interface for supplying electric power stored in the hybrid battery to the outside. Further, the vehicle 100 includes a data communication module (DCM) 10 and an in-vehicle terminal 20.

The DCM 10 is a communication module for connecting the in-vehicle terminal 20 to a network. The in-vehicle terminal 20 is an information terminal mounted on the vehicle 100. The in-vehicle terminal 20 is also called an infotainment terminal, and has a function of providing information (for example, traffic information and route guidance) and entertainment (for example, music and moving images) to the occupant of the vehicle. Further, when the in-vehicle terminal 20 receives an emergency message sent by a public institution via the DCM10, the in-vehicle terminal 20 has a function of providing the user with information (guide information) for instructing the user on how to handle the vehicle 100 according to the content of the emergency message. As a result, the user of the vehicle 100 can obtain necessary information on the vehicle 100 in an emergency.

The external device 200 is a device that transmits an emergency message sent by a public institution. The external device 200 may be a device included in a mobile communication network. The external device 200 receives the emergency message sent by the national government or a local government, and transmits the emergency message all at once to terminal devices located in a predetermined area. The predetermined area may be defined in accordance with, for example, an administrative division, but may be other than this. An emergency message is typically information on a disaster. The emergency message may include, for example, a message for notifying the occurrence of an earthquake (EEW), a message for predicting the danger of a disaster (evacuation preparation information and evacuation order information), a message related to the safety of the people, or the like. Further, the emergency message may include a message for requesting a consumer to save power when a balance between power supply and power demand is lost (or when it is predicted that the balance will be lost). The emergency message can be transmitted using, for example, the Earthquake and Tsunami Warning System (ETWS), the Cell Broadcast Service (CBS), or the like.

Figure 2:
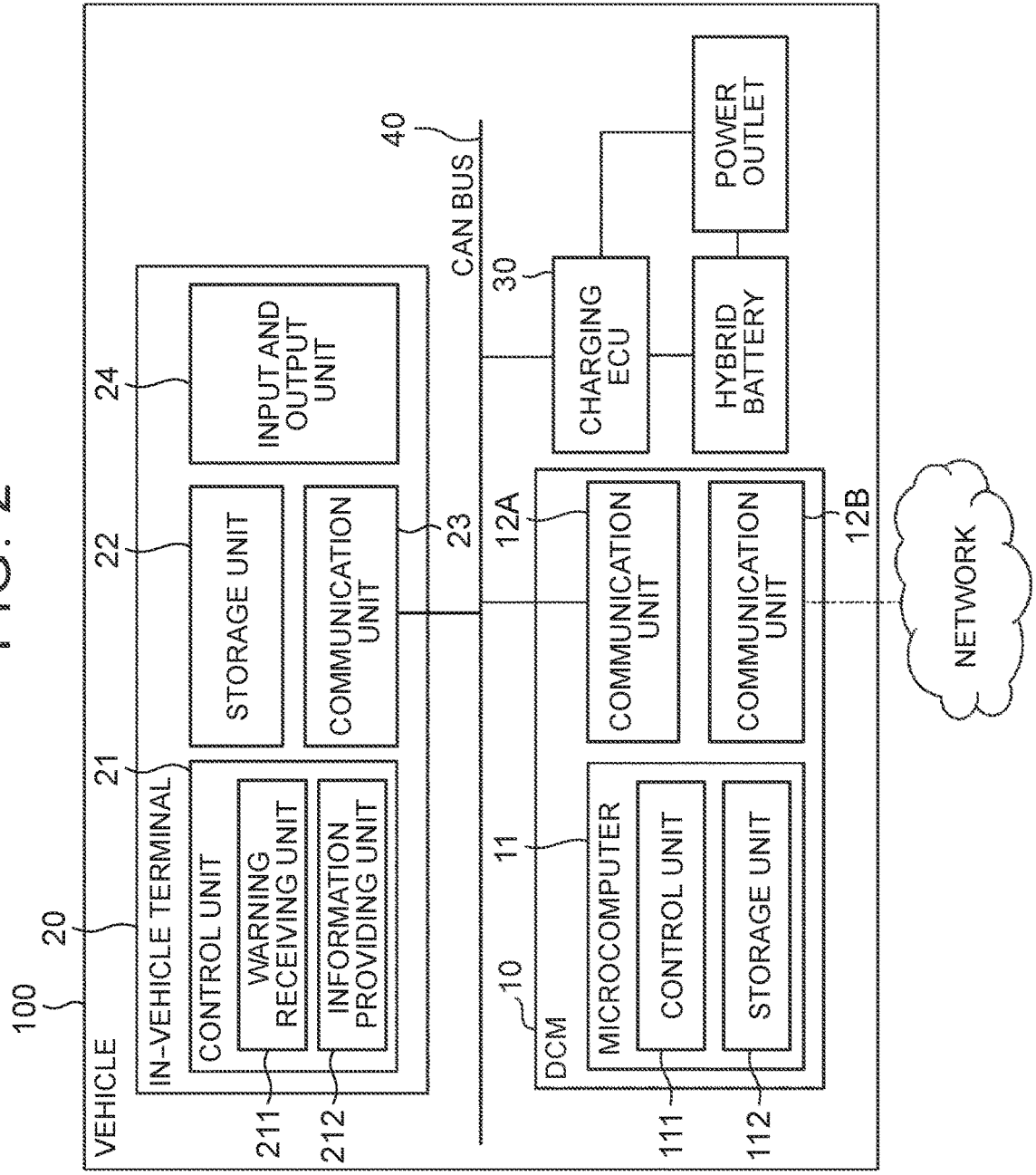
FIG. 2 is a block diagram showing components included in a vehicle.

Next, components of the system will be described in detail. FIG. 2 is a block diagram schematically showing an example of the configuration of the vehicle 100 shown in FIG. 1. The vehicle 100 includes the DCM 10, the in-vehicle terminal 20, and a charging electronic control unit (ECU) 30. These components are connected to each other by a Controller Area Network (CAN) bus 40 that is a bus of an in-vehicle network. In the present embodiment, the DCM10, the in-vehicle terminal 20, and the charging ECU 30 are illustrated as devices connected to the in-vehicle network, but the vehicle 100 may include a plurality of computers that controls the vehicle, such as an engine ECU and a body ECU.

The DCM 10 is an interface unit that connects the in-vehicle network and a communication network outside of the vehicle 100. Hereinafter, the communication network outside of the vehicle 100 is simply referred to as a network or an external network. Examples of the external network include a wide area network such as the Internet. The DCM 10 includes a microcomputer 11, a communication unit 12A that is an interface for communicating with the CAN bus 40, and a communication unit 12B that is an interface for communicating with the external network.

The microcomputer 11 can be configured as a microcomputer provided with a processor such as a central processing unit (CPU) or a graphics processing unit (GPU), a main storage device such as a random access memory (RAM) or a read-only memory (ROM), and an auxiliary storage device such as an erasable programmable read-only memory (EPROM), a disk drive, or a removable media. However, some or all of the functions may be implemented by a hardware circuit such as an application specific integrated circuit (ASIC) or a field programmable gate array (FPGA).

In the present embodiment, the microcomputer 11 includes a control unit 111 and a storage unit 112. The control unit 111 is a calculation unit (processor) that realizes various functions of the DCM 10 by executing a predetermined program. The storage unit 112 is a memory device including a main storage device and an auxiliary storage device. An operating system (OS), various programs, various tables, and the like are stored in the auxiliary storage device. The programs stored in the auxiliary storage device are loaded into the work area of the main storage device and executed, and through this execution, various functions can be implemented that match the predetermined purpose, which will be described later.

The DCM 10 has a function of mediating communication between the external network and the vehicle 100. For example, when the component (such as the ECU) of the vehicle 100 requires communication with the external network, the DCM 10 relays the data transmitted from the ECU or the like to the external network. In addition, the DCM 10 receives the data transmitted from the external network and transfers the data to an appropriate ECU or the like. In the present embodiment, the DCM 10 has a function of transferring the emergency message to the in-vehicle terminal 20 when the emergency message is received from the external device 200.

In addition, the DCM 10 can execute functions specific to its own device. For example, the DCM 10 has a security system monitoring function, a call function, and an emergency notification function, and can make a security call, an emergency call, or the like based on a trigger generated in the vehicle.

The communication unit 12A is a communication interface that connects the DCM 10 to the in-vehicle network (CAN bus 40). The communication unit 12A executes a process of converting a message in a predetermined format generated by the microcomputer 11 into CAN data and a process of converting the received CAN data into a message in a predetermined format and transmitting the message to the microcomputer 11. The communication unit 12B is a communication interface that connects the DCM 10 to the external network. The communication unit 12B executes a process of converting a message in a predetermined format generated by the microcomputer 11 into a communication packet and a process of converting the received communication packet into a message in a predetermined format and transmitting the message to the microcomputer 11.

Next, the in-vehicle terminal 20 will be described. The in-vehicle terminal 20 is an infotainment terminal that provides information to the occupant of the vehicle. The in-vehicle terminal 20 has a route guidance function, an audio/visual function, a network function, and the like, and can provide information and entertainment to the occupant of the vehicle.

The in-vehicle terminal 20 can be configured by a general-purpose computer. That is, the in-vehicle terminal 20 can be configured as a computer provided with a processor such as a CPU or a GPU, a main storage device such as a RAM or a ROM, an auxiliary storage device such as an EPROM, a hard disk drive, and a removable medium. An OS, various programs, various tables, and the like are stored in the auxiliary storage device. The programs stored in the auxiliary storage device are executed such that various functions can be implemented that match the predetermined purpose, which will be described later. However, some or all of the functions may be implemented by a hardware circuit such as an ASIC or an FPGA.

The in-vehicle terminal 20 includes a control unit 21, a storage unit 22, a communication unit 23, and an input and output unit 24.

The control unit 21 is means for controlling the in-vehicle terminal 20. The control unit 21 is composed of, for example, an information processing unit such as a CPU or a GPU. The control unit 21 includes a warning receiving unit 211 and an information providing unit 212 as functional modules. Each functional module may be implemented by causing the CPU to execute a program that is stored in storage means such as a ROM.

The warning receiving unit 211 receives an emergency message via the DCM10. The emergency message is a message that is sent all at once by the national government or a local government to mobile communication terminals located in a predetermined area. The emergency message is also called an early warning email or Area Mail (registered trademark), and is a message for notifying the people of the EEW, tsunami warning, information on other disasters, and the like. The emergency message may be a message for notifying the people of information other than the information described above. The warning receiving unit 211 is put in a stand-by status for the emergency message while the device is in operation, and when the emergency message is received, the warning receiving unit 211 notifies the user of the emergency message via the input and output unit 24 described later and transmits the emergency message to the information providing unit 212 described later.

The information providing unit 212 provides information to the occupant of the vehicle. The information to be provided includes, for example, traffic information, navigation information, music and video, radio broadcasting, digital television broadcasting, and the like. When the information providing unit 212 receives the emergency message, the information providing unit 212 provides the information to the user of the vehicle 100. The information providing unit 212 has a function of managing an electronic manual of the vehicle 100, and when the received emergency message is related to the occurrence of an earthquake, the information providing unit 212 accesses the stored electronic manual and provides the user with information on how to use an external power supply function of the vehicle 100, as guide information.

Figure 3A:
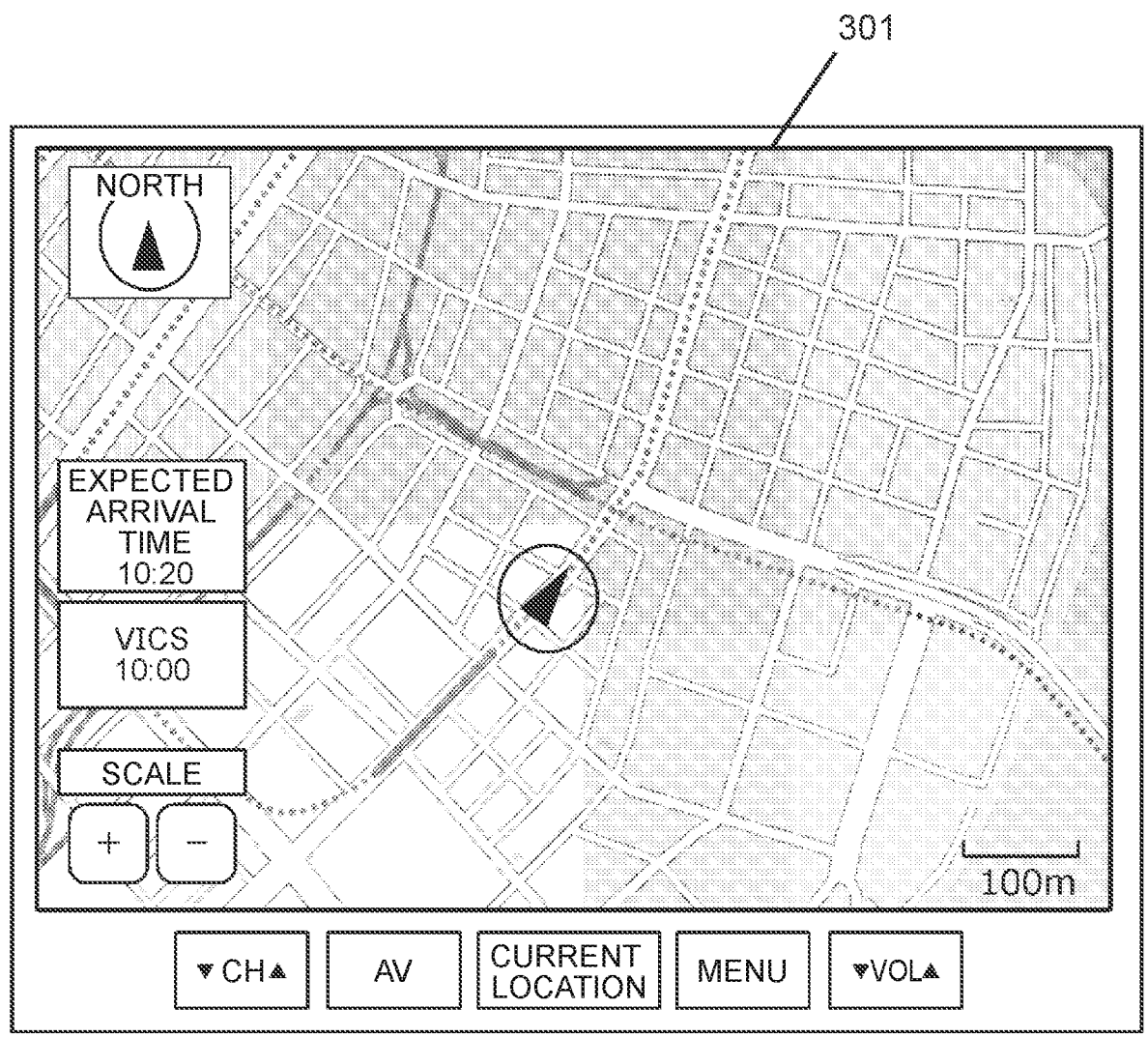
FIG. 3A is a diagram illustrating information output by an in-vehicle terminal.
Figure 3B:
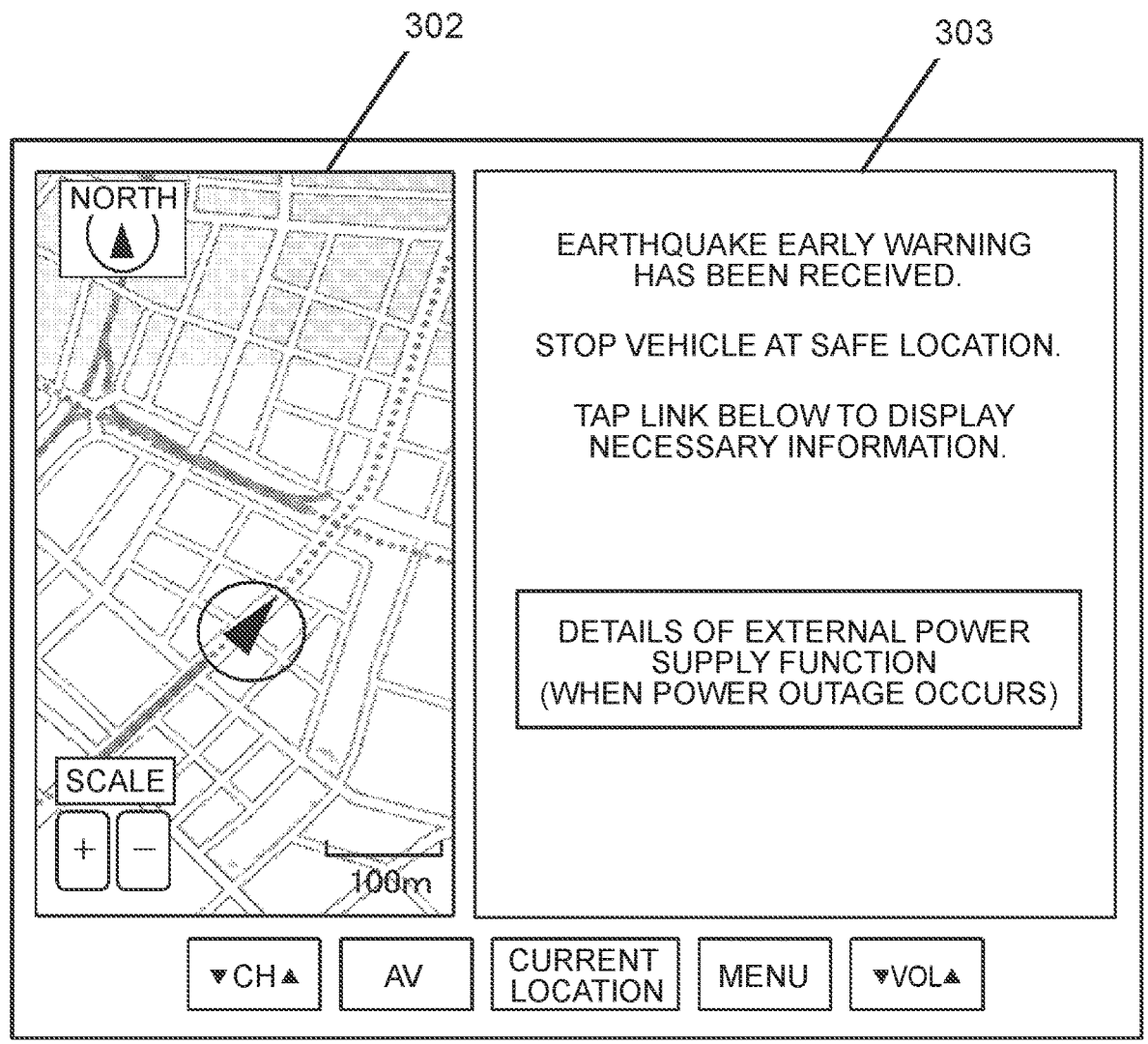
FIG. 3B is a diagram illustrating information output by the in-vehicle terminal.

The information providing unit 212 can provide guide information in two display modes. FIG. 3A is an example of a normal display mode (first display mode). In the present embodiment, information is provided using the full screen (reference symbol 301) excluding an operation unit. On the other hand, when the information providing unit 212 receives the emergency message, the information providing unit 212 switches the display mode to a second display mode. FIG. 3B is an example of the second display mode. In the second display mode, a display area in the first display mode is reduced (reference symbol 302), and an area for outputting the guide information related to the emergency message is provided (reference symbol 303). This makes it possible to provide necessary information to the user in an emergency situation.

The storage unit 22 is means for storing information, and is composed of a storage medium such as a RAM, a magnetic disk, or a flash memory. The storage unit 22 stores various programs executed by the control unit 21, data used by the programs, and the like. Further, the storage unit 22 stores the electronic manual (manual data) of the vehicle 100 acquired in advance. The electronic manual can be, for example, an electronic document accessible using a section number or a page number. FIG. 4 is an example of the electronic manual stored in the storage unit 22. In the present embodiment, the electronic manual includes electronic document data and heading data. The electronic document data is data of the text of the electronic manual, and the heading data is data in which the table of contents of the electronic manual is recorded.

The communication unit 23 is an interface for connecting the in-vehicle terminal 20 to the mobile communication network. The communication unit 23 can communicate with a wide area network (for example, the Internet) using, for example, the mobile communication network, a wireless local area network (LAN), Bluetooth (registered trademark), or the like.

The input and output unit 24 is means for receiving the input operation performed by the user and presenting information to the user. Specifically, the input and output unit 24 is composed of a touch panel and its control means, and a liquid crystal display and its control means. The touch panel and the liquid crystal display are composed of one touch panel display in the present embodiment. Further, the input and output unit 24 may include a speaker or the like for outputting audio. For example, when the warning receiving unit 211 receives an emergency message, the input and output unit 24 outputs an audio thereof and displays the content thereof on the liquid crystal display.

The charging ECU 30 is an electronic control unit that controls charging and discharging of a driving battery (hybrid battery) included in the vehicle 100. The charging ECU 30 controls driving of a drive shaft by electric power stored in the hybrid battery, recovery of the electric power by a regenerative brake, and the like. In addition, as necessary, the charging ECU 30 controls to supply the electric power stored in the hybrid battery to the outside. The electric power can be supplied via the power outlet provided in the vehicle 100.

The CAN bus 40 is a communication bus that constitutes the in-vehicle network based on the CAN protocol. In the present embodiment, one CAN bus 40 is exemplified. However, the in-vehicle network may include a plurality of communication buses. Further, the in-vehicle network may include a gateway that connects the communication buses to each other.

When the user performs a predetermined operation, the vehicle 100 can be switched to a mode of supplying electric power to the outside of the vehicle. This control is executed by the charging ECU 30. However, when a user unfamiliar with the operation attempts to switch a mode, the user must refer to the vehicle manual to find out an operation method. In particular, the external power supply function of the vehicle is often required in the event of a disaster such as an earthquake. Therefore, in the present embodiment, when the in-vehicle terminal 20 receives an emergency message regarding an earthquake, the in-vehicle terminal 20 executes a process of providing the user with information regarding the external power supply described in the electronic manual of the vehicle 100.

A process to be executed when the in-vehicle terminal 20 receives an emergency message via the DCM 10 will be specifically described. First, the warning receiving unit 211 transmits the received emergency message to the information providing unit 212. The information providing unit 212 determines the type of the received emergency message. There may be a plurality of types of the emergency messages, but in the present embodiment, the information providing unit 212 determines whether the emergency message is related to the occurrence of an earthquake. For example, when header information of the emergency message contains data indicating a type of information and the information providing unit 212 refers to the data, it is possible to determine whether the emergency message is related to the occurrence of the earthquake. Further, the information providing unit 212 may also detect that a keyword such as "earthquake" is included in the text of the emergency message.

Next, the information providing unit 212 switches the display mode from the first display mode to the second display mode, and secures a space for providing information. Then, the information providing unit 212 outputs, using the secured space, information related to the earthquake (in the present embodiment, information related to the external power supply) from among the information contained in the electronic manual of the vehicle. By continuously performing these operations, the in-vehicle terminal 20 can provide the user with necessary information from among the information included in the electronic manual of the vehicle. The information providing unit 212 may notify the user when the information is ready to be provided, and may start providing the information to the user based on a request from the user.

Figure 5:
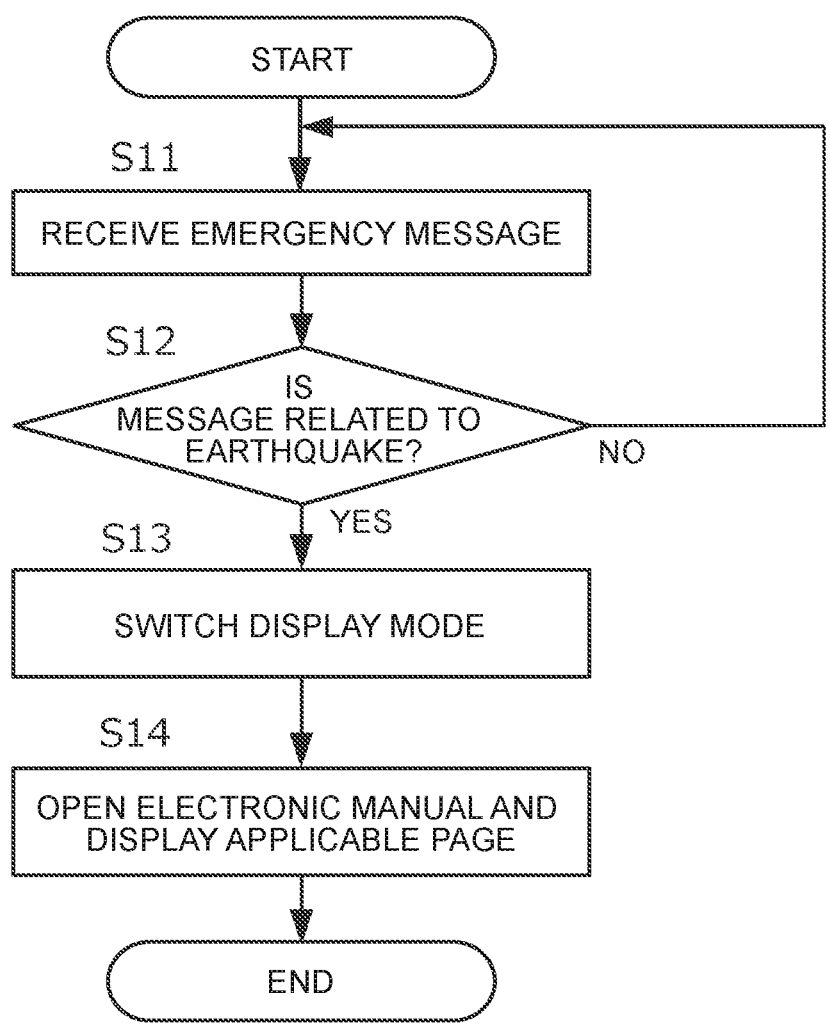
FIG. 5 is a flowchart of a process executed by an in-vehicle terminal in a first embodiment.

FIG. 5 is a flowchart of a process executed by the in-vehicle terminal 20 (control unit 21). The process is started when an emergency message is received. First, in step S11, the warning receiving unit 211 receives an emergency message. The received emergency message is transmitted to the information providing unit 212. Next, in step S12, the information providing unit 212 determines whether the received emergency message is related to the occurrence of an earthquake. When the determination result is Yes, the process proceeds to step S13. When the determination result is No, the process returns to the initial state.

In step S13, the information providing unit 212 switches the display mode. Specifically, as described above with reference to FIG. 3B, the area where the current information is output is reduced, and the obtained space is used to secure an area for providing guide information regarding the earthquake.

In step S14, the information providing unit 212 proposes to the user to provide the guide information. For example, the screen as shown in FIG. 3B is output and a response from the user is acquired. When the user requests provision of information, the applicable information from among the information contained in the electronic manual is output. For example, when the electronic manual is an application program, the application program is started. When the electronic manual is a document file, the document file is read. Then, a predetermined page in the electronic manual, that is, a page describing a method of using the external power supply function of the vehicle (page 302 in the example of FIG. 4) is displayed. In any case, the guide information is provided within an area secured in step S13 (reference symbol 303).

The illustrated proposal process may be omitted. That is, the information may be automatically started to be provided regardless of the intention of the user.

As described above, the in-vehicle terminal 20 according to the present embodiment determines the type of the emergency message when then emergency message is received from the external device 200, and when the content of the emergency message is related to an earthquake, the in-vehicle terminal 20 executes the process for instructing the user on the method of using the external power supply function of the vehicle. As a result, the user can obtain necessary information on the vehicle owned by the user without performing a voluntary operation.

Figure 3C:
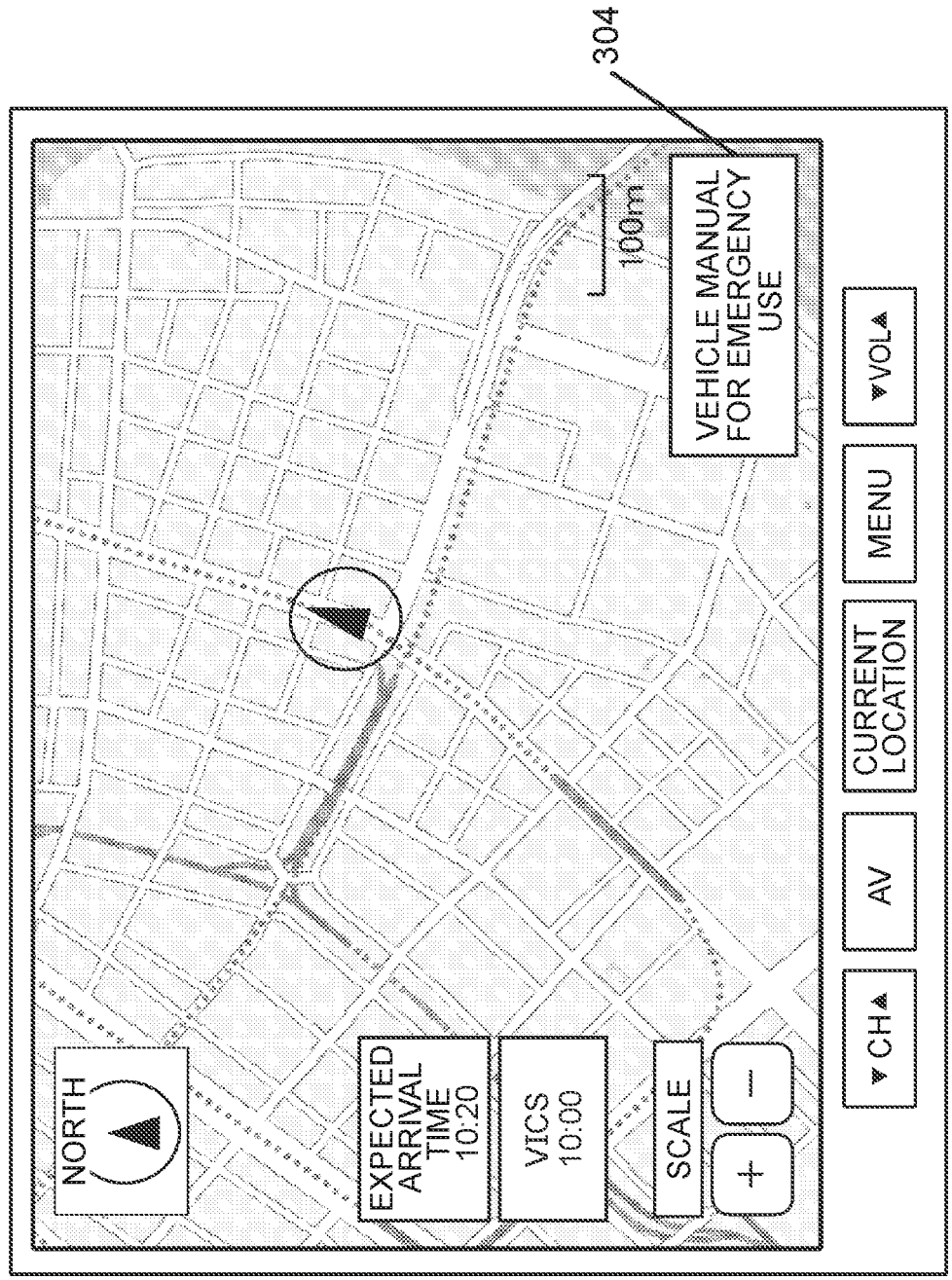
FIG. 3C is a diagram illustrating information output by the in-vehicle terminal.

In the present embodiment, an example is shown in which a screen area is divided into two areas and one of them is used to provide the guide information, but the size of each area may be variable. For example, the size of the area for displaying the electronic manual may be minimized according to an operation of the user. In this case, as shown in FIG. 3C, a part for restoring the size of the area to the original size (reference symbol 304) may be provided on the screen, and when the part is tapped, the size of the area may be restored to the original size. In either case, it is preferable that the graphical user interface (GUI) part for allowing access to the electronic manual be always displayed while the information processing device is in the second display mode.

The information providing unit 212 may switch the mode from the second display mode to the first display mode at a predetermined timing. The predetermined timing may be a timing at which the user performs a predetermined operation, or may be a timing at which predetermined time has elapsed since the first display mode was switched to the second display mode. Further, when an emergency message notifying termination of the warning or the like is transmitted, the mode may be switched upon receipt of the message.

Second Embodiment

In the first embodiment, in the process of step S12, it is determined whether the emergency message is related to an earthquake, and when the emergency message is related to an earthquake, the process for instructing the user on the method of using the external power supply function of the vehicle is executed. On the other hand, a second embodiment is an embodiment in which different information is output according to a type of emergency message received.

For example, when the emergency message is related to a flood or tsunami, it is preferable to present, to the user, information on water damage to a vehicle and evacuation by a vehicle. In addition, when the emergency message is a message for predicting the approach of hurricane, it is also preferable to recommend the user to fully charge a plug-in hybrid vehicle in case of a power outage. Further, when the emergency message notifies the user of tight power supply (that is, a risk of power outage), it is preferable to instruct the user on how to supply power from the vehicle to a building in order to save power.

In the second embodiment, the in-vehicle terminal 20 stores data that associates the type of the emergency message with the information to be presented to the user (hereinafter referred to as the type data). FIG. 6 is an example of the type data to be stored in the storage unit 22. In FIG. 6, the type of emergency message and the information to be presented are described in sentences, but these may be defined by an identifier.

FIG. 7 is a flowchart of a process executed by the in-vehicle terminal 20 in the second embodiment. The same process as that of the first embodiment is shown by a dotted line, and the description thereof will be omitted. When the warning receiving unit 211 receives the emergency message, the information providing unit 212 acquires the type of emergency message in step S12A. The type of emergency message may be acquired, for example, by referring to the header of the message, or by analyzing the text of the message. For example, keywords such as "earthquake", "electric power", and "flood" may be detected from the text of the message. Then, the information to be presented to the user is specified based on the type data stored in advance. For example, in the example of FIG. 6, when the emergency message is a message for predicting heavy rain, it is determined that the page describing the measures against water damage to the vehicle (page 358) is presented. The steps after step S13 are the same as those in the first embodiment.

As described above, in the second embodiment, a plurality of different pieces of information is presented to the user based on the type of emergency message. According to such a configuration, it becomes possible to provide information more flexibly.

Third Embodiment

Figure 9:
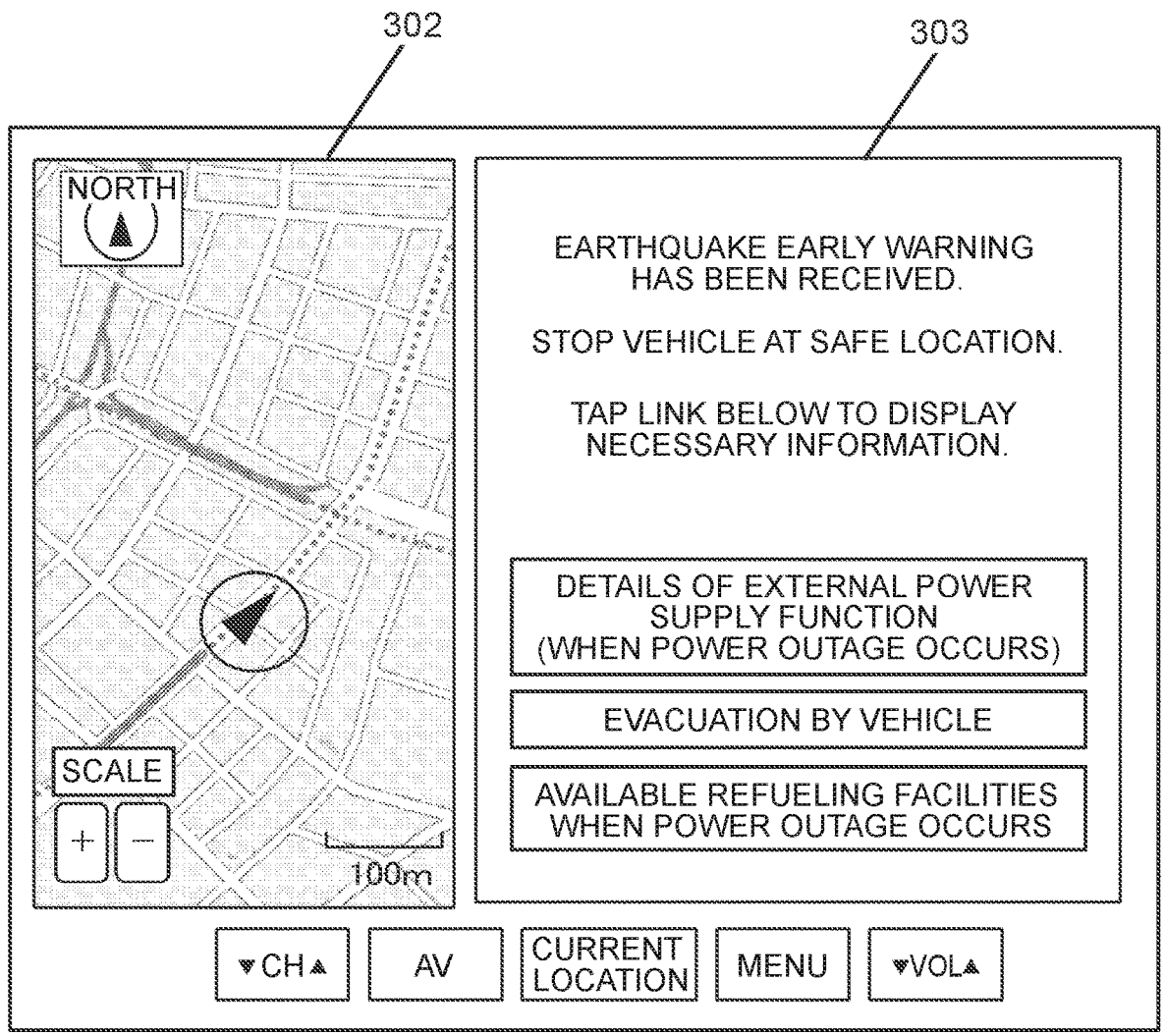
FIG. 9 is a diagram illustrating a modified example of information output by an in-vehicle terminal.

In the first and second embodiments, only one type of information is presented for one emergency message, but other types of information may be selectively presented. For example, when the type of emergency message is related to an earthquake, a plurality of pieces of information such as "evacuation method in the event of an earthquake", "information on available gas stations when power outage occurs", and "other vehicle functions that can be used in emergency situations" may be presented. FIG. 8 is an example of type data in a third embodiment. In the third embodiment, a plurality of pieces of information is defined for each type of emergency message. Further, when a plurality of pieces of information is defined for each type data, the information providing unit 212 presents to the user that the pieces of information can be provided. FIG. 9 is an example of a screen for allowing the user to select the pieces of information. In the present embodiment, the information selected by the user is output via the input and output unit 24. When the user selects the information, the information providing unit 212 presents the selected information to the user. For example, in the example of FIG. 9, when the user selects "evacuation by vehicle", the page 410 in the electronic manual is output.

Modified Example

The above-described embodiments are merely examples, and the present disclosure may be appropriately modified and implemented without departing from the scope thereof. For example, the processes and means described in the present disclosure can be freely combined and implemented as long as no technical contradiction occurs.

Further, in the description of the embodiments, the electronic manual having a form as an electronic document is stored, but information may be retained in another format as long as information for instructing the user on how to handle the vehicle is presented. For example, the type data may contain the information itself to be provided rather than a reference to the electronic document.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiments, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing device that is configured to provide information to an occupant of a vehicle, the information processing device comprising a control unit that is configured to execute:
   receiving an emergency message notifying of an occurrence of a predetermined event; and
   switching a mode from a first display mode to a second display mode that is a mode for providing guide information for instructing the occupant on how to handle the vehicle when the emergency message is received, wherein
   the guide information includes information on how to use the vehicle as a power source and supply power to a power receiver that is external to the vehicle, wherein
   the information processing device further comprises a storage unit for storing the guide information to be provided in the second display mode,
   the storage unit stores electronic manual data for handling the vehicle, wherein the electronic manual data includes the information on how to use the vehicle as the power source and supply power to the power receiver that is external to the vehicle, and
   the storage unit stores a type of the emergency message, a category of the guide information to be provided, and page numbers of the electronic manual data such that the type of the emergency message, the category of the guide information to be provided, and the page numbers of the electronic manual data are associated with one another.

2. The information processing device according to claim 1, wherein the second display mode is a mode in which the guide information is provided by omitting at least part of information provided in the first display mode and using a space obtained as a result of omitting the part of the information.

3. The information processing device according to claim 1, wherein the control unit is configured to provide the guide information according to the type of the emergency message.

4. The information processing device according to claim 3, wherein the control unit is configured to provide information related to evacuation by the vehicle as the guide information when the type of the emergency message is related to an earthquake.

5. The information processing device according to claim 1, wherein the control unit is configured to switch the mode from the second display mode to the first display mode when a predetermined operation is performed.

* * * * *

UNITED STATES PATENT AND TRADEMARK OFFICE
CERTIFICATE OF CORRECTION

| | | |
|---|---|---|
| PATENT NO. | : 12,142,144 B2 | Page 1 of 1 |
| APPLICATION NO. | : 17/671010 | |
| DATED | : November 12, 2024 | |
| INVENTOR(S) | : Hideo Hasegawa | |

It is certified that error appears in the above-identified patent and that said Letters Patent is hereby corrected as shown below:

On the Title Page

Item (54) and In the Specification, Column 1, Line 1, Delete:
"INFORMATION PROCESSING DEVICE, VEHICLE, INFORMATION PROCESSING METHOD, AND NON-TRASITORY STORAGE MEDIUM FOR PROVIDING GUIDANCE INFORMATION INSTRUCTING AN OCCUPANT HOW TO HANDLE A VEHICLE FROM A RECEIVED EMERGENCY MESSAGE"

Insert:
--INFORMATION PROCESSING DEVICE, VEHICLE, INFORMATION PROCESSING METHOD, AND NON-TRANSITORY STORAGE MEDIUM FOR PROVIDING GUIDANCE INFORMATION INSTRUCTING AN OCCUPANT HOW TO HANDLE A VEHICLE FROM A RECEIVED EMERGENCY MESSAGE--

Signed and Sealed this
Eleventh Day of February, 2025

Coke Morgan Stewart
*Acting Director of the United States Patent and Trademark Office*